(12) United States Patent
Tsutsui et al.

(10) Patent No.: US 8,901,183 B2
(45) Date of Patent: *Dec. 2, 2014

(54) EXPANDABLE COMPOSITE RESIN PARTICLES FOR LONG-TERM STORAGE, PRE-EXPANDED PARTICLES FORMED THEREFROM AND EXPANDED MOLDED ARTICLES

(71) Applicant: Sekisui Plastics Co., Ltd., Osaka (JP)

(72) Inventors: Yasutaka Tsutsui, Shiga (JP); Masahiko Ozawa, Shiga (JP)

(73) Assignee: Sekisui Plastics Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/212,090

(22) Filed: Mar. 14, 2014

(65) Prior Publication Data

US 2014/0200282 A1 Jul. 17, 2014

Related U.S. Application Data

(63) Continuation of application No. 13/147,662, filed as application No. PCT/JP2010/053329 on Mar. 2, 2010, now Pat. No. 8,765,826.

(30) Foreign Application Priority Data

Mar. 3, 2009 (JP) ................................ 2009-049212

(51) Int. Cl.
| | |
|---|---|
| *C08J 9/00* | (2006.01) |
| *C08J 9/12* | (2006.01) |
| *C08J 9/16* | (2006.01) |
| *C08J 9/20* | (2006.01) |
| *C08J 9/228* | (2006.01) |
| *C08J 9/18* | (2006.01) |

(52) U.S. Cl.
CPC ............... *C08J 9/18* (2013.01); *C08J 2203/14* (2013.01); *C08J 9/0061* (2013.01); *C08J 2325/06* (2013.01); *C08J 2423/00* (2013.01)

USPC .................. 521/59; 521/56; 521/60; 521/134; 521/143; 521/144; 521/149

(58) Field of Classification Search
USPC ................ 521/56, 59, 134, 143, 60, 144, 149
See application file for complete search history.

(56) References Cited

U.S. PATENT DOCUMENTS

| | | | |
|---|---|---|---|
| 4,429,059 A | | 1/1984 | Ozutsumi et al. |
| 5,496,864 A | * | 3/1996 | Henn et al. ...................... 521/59 |
| 5,525,636 A | * | 6/1996 | Henn et al. ...................... 521/59 |
| 5,585,410 A | * | 12/1996 | Scherzer et al. ................ 521/56 |
| 6,225,363 B1 | | 5/2001 | Wilkes et al. |
| 7,683,101 B2 | | 3/2010 | Inada et al. |
| 7,767,723 B2 | | 8/2010 | Matsumura et al. |
| 7,767,724 B2 | | 8/2010 | Matsumura et al. |
| 2010/0022674 A1 | | 1/2010 | Morioka et al. |

FOREIGN PATENT DOCUMENTS

| | | |
|---|---|---|
| JP | 58-198541 A | 6/1983 |
| JP | 1-279935 A | 11/1989 |
| JP | 4-31448 A | 2/1992 |
| JP | 4-31449 A | 2/1992 |
| JP | 4-39338 A | 2/1992 |
| JP | 6-104746 A | 12/1994 |
| JP | 2004-244529 A | 9/2004 |
| JP | 2008-133449 A | 6/2008 |
| WO | 2008/050909 A1 | 5/2008 |

OTHER PUBLICATIONS

Extended European Search Report issued with respect to European Application No. 10 74 8740.7, mail date is Nov. 18, 2013.
Search report from International Application No. PCT/JP2010/053329, mail date is Apr. 13, 2010.
Definition of "Polyolefin" from Hawley's Condensed Chemical Dictionary. John Wiley & Sons. 14th Edition. 2002.

* cited by examiner

*Primary Examiner* — Kara Boyle
(74) *Attorney, Agent, or Firm* — Greenblum & Bernstein, P.L.C.

(57) ABSTRACT

Expandable composite resin particles for long-term storage, comprising 500 to 5000 ppm of water and 7.5 to 11.0% by weight of pentane in composite resin of polyolefin-based resin and polystyrene-based resin.

1 Claim, 3 Drawing Sheets

EXPANDABLE COMPOSITE RESIN PARTICLES FOR LONG-TERM STORAGE, PRE-EXPANDED PARTICLES FORMED THEREFROM AND EXPANDED MOLDED ARTICLES

CROSS REFERENCE TO RELATED APPLICATIONS

The present application is a continuation of U.S. application Ser. No. 13/147,662, which is a National Stage of International Patent Application No. PCT/JP2010/053329 filed Mar. 2, 2010, which claims priority to Japanese Application No. 2009-049212 filed Mar. 3, 2009. The disclosures of U.S. application Ser. No. 13/147,662 and International Patent Application No. PCT/JP2010/053329 are incorporated by reference herein in their entireties.

TECHNICAL FIELD

The present invention relates to expandable composite resin particles for long-term storage. More particularly the present invention relates to expandable composite resin particles for long-term storage comprising water and pentane as a volatile blowing agent in resin of polyolefin-based resin and polystyrene-based resin. The present invention further relates to pre-expanded particles and expanded molded articles (molded foam) obtained from the expandable composite resin particles.

BACKGROUND ART

Generally, expandable particles comprising composite resin of polyolefin-based resin and polystyrene-based resin (may be simply referred to as expandable composite resin particles) are obtained by impregnating composite resin particles (may be simply referred to as resin particles) with a volatile blowing agent. In addition, it is known that water is included in the expandable composite resin particles in order to improve the moldability of expanded molded articles (see, for example, Japanese Examined Patent Publication No. HEI 6 (1994)-104746 (Patent Document 1)).

In Patent Document 1, the expandable composite resin particles contain 0.5 to 1.5% by weight of water, and the volatile blowing agent used in Examples is butane (n-butane: 70% and isobutane: 30%).

PRIOR ART DOCUMENTS

Patent Document

[Patent Document 1] Japanese Examined Patent Publication No. HEI 6 (1994)-104746

SUMMARY OF THE INVENTION

Problems to be Solved by the Invention

The volatile blowing agent actually used in the publication is butane. Butane is generally used, because at normal temperature, butane is in a gaseous state, while pentane is in a liquid state, having different properties and therefore being difficult to provide constant quality.

In many cases, recently, production of expandable composite resin particles, and expansion and process of the produced expandable composite resin particles are performed in different places. In such cases, it is necessary to transport the expandable composite resin particles. For transporting expandable composite resin particles containing butane usually used as an easily volatile blowing agent, it is necessary to prevent release of butane as far as possible to maintain the expandability of the expandable composite resin particles. While refrigerated or frozen transportation is generally used, a pressure-resistant container needs to be used in the case of the expandable composite resin particles containing butane from a safety standpoint in view of pre-expansion to be performed later at normal temperature, even if the particles are frozen at approximately −15° C. and frozen-transported after being sufficiently cooled, for example. Disadvantageously, therefore, it was impossible to transport a large amount of expandable composite resin particles, and the transportation itself was costly.

On the other hand, when pentane, which is in a liquid state at normal temperature, is used as a blowing agent, it is possible to sufficiently ensure the safety in the pre-expansion and the expandability of the expandable composite resin particles without a pressure-resistant container by using a container (including the one having a bag shape) that can be hermetically sealed, as long as the expandable composite resin particles containing pentane are refrigerated or frozen.

Disadvantageously, however, foams obtained by molding particles obtained by pre-expanding expandable composite resin particles refrigerated or frozen for a certain period of time would have poor appearance and reduced physical properties.

It has been therefore desired to develop expandable composite resin particles for long-term storage that allow mass transportation with a normal hermetic container (including the one having a bag shape).

Means for Solving the Problems

The present invention therefore provides expandable composite resin particles for long-term storage, comprising 500 to 5000 ppm of water and 7.5 to 11.0% by weight of pentane in composite resin of polyolefin-based resin and polystyrene-based resin.

The present invention also provides pre-expanded particles obtained by pre-expanding the expandable composite resin particles for long-term storage.

The present invention further provides expanded molded articles obtained by molding the pre-expanded particles in a mold.

Effects of the Invention

The expandable composite resin particles for long-term storage of the present invention allow long-term storage with a normal hermetic container as containing specified amounts of water and pentane as a volatile blowing agent. As a result, a large amount of expandable composite resin particles can be transported to reduce transportation cost.

MODE FOR CARRYING OUT THE INVENTION

Figure 1:
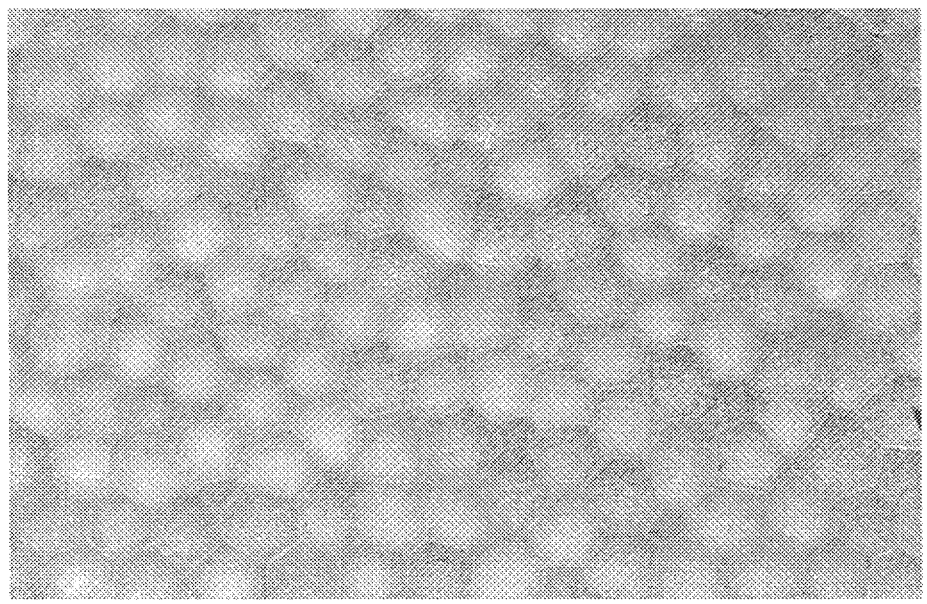
FIG. 1 is a scanner image of a sliced surface of a molded article obtained in Example 1.

In the expandable composite resin particles for long-term storage of the present invention, the composite resin of polyolefin-based resin and polystyrene-based resin contains specified amounts of water and pentane. The term long-term storage means that the amounts of the water and the pentane can be maintained in a specified range for 72 hours or more when the particles are refrigerated or frozen.

(Composite Resin Particles)

The polyolefin-based resin is not particularly limited, and commonly known resin can be used. Further, the polyolefin-based resin may be cross-linked. Examples thereof include polyethylene-based resin such as branched low-density polyethylene, linear low-density polyethylene, medium-density polyethylene, high-density polyethylene, ethylene-vinyl acetate copolymer, ethylene-methyl methacrylate copolymer and cross-linked polymer of these polymers; and polypropylene-based resin such as propylene homopolymer, ethylene-propylene random copolymer, propylene-1-butene copolymer and ethylene-propylene-butene random copolymer. In the examples, the low density preferably refers to 0.91 to 0.94 g/cm$^3$, and more preferably refers to 0.91 to 0.93 g/cm$^3$. The high density preferably refers to 0.95 to 0.97 g/cm$^3$, and more preferably refers to 0.95 to 0.96 g/cm$^3$. The medium density refers to a medium density between the low density and the high density.

The polystyrene-based resin is polystyrene or copolymer derived from styrene as a main component and a comonomer that can be copolymerized with styrene. The main component means that styrene accounts for 70% by weight or more of all the monomers. Examples of the comonomer include α-methylstyrene, p-methylstyrene, acrylonitrile, methacrylonitrile, acrylic acid, methacrylic acid, acrylic acid alkylester, alkyl methacrylate ester, divinylbenzene and polyethylene glycol dimethacrylate. In the examples, alkyl means alkyl having 1 to 8 carbon atoms.

More preferably, the polyolefin-based resin is branched low-density polyethylene, linear low-density polyethylene or ethylene-vinyl acetate copolymer; and the polystyrene-based resin is polystyrene, styrene-acrylic acid alkylester copolymer or styrene-alkyl methacrylate ester copolymer. In the examples, the low density preferably refers to 0.91 to 0.93 g/cm$^3$.

The content of the polystyrene-based resin in the expandable resin particles is in a range of 110 to 730 parts by weight with respect to 100 parts by weight of the polyolefin-based resin particles. In addition, the amount of the styrene-based monomer blended as the material of the polystyrene-based resin is 110 to 730 parts by weight with respective to 100 parts by weight of the polyolefin-based resin particles, corresponding to the content of the polystyrene-based resin.

When the content of the polystyrene-based resin is more than 730 parts by weight, the resulting expanded molded articles may have reduced resistance to cracking. On the other hand, when the content is less than 110 parts by weight, the resistance to cracking considerably improves, but dissipation of the blowing agent from the surfaces of the expandable resin particles tends to be faster. The ability of retaining the blowing agent may be therefore reduced to shorten the life of the expandable resin particles as beads. More preferably, the content of the polystyrene-based resin is 120 to 560 parts by weight, and even more preferably the content is 140 to 450 parts by weight.

The composite resin of polyolefin-based resin and polystyrene-based resin means mixed resin of polyolefin-based resin and polystyrene-based resin. As the mixed resin, resin obtained by simply mixing polyolefin-based resin and polystyrene-based resin may be used, but polyolefin-modified styrene-based resin to be described below is preferable. More preferably, the mixed resin is polyethylene-modified styrene-based resin.

The polyolefin-modified styrene-based resin particles (may be simply referred to as modified resin particles) can be obtained by adding styrene-based monomer into an aqueous medium retaining polyolefin-based resin particles dispersed therein and polymerizing the same. Hereinafter, a method for producing the modified resin particles will be described.

Polyolefin-based resin particles can be obtained by a commonly known method. For example, the polyolefin-based resin particles can be produced by melt extruding polyolefin-based resin with an extruder, and then granulating the resin by in-water cutting or strand cutting. Usually, the polyolefin-based resin particles to use have a true spherical shape, an elliptic spherical shape (egg shape), a cylindrical shape, a rectangular shape, a pelletized shape or a granular shape, for example. Hereinafter, the polyolefin-based resin particles may be referred to as micropellets.

The polyolefin-based resin particles may contain a radical scavenger. The radical scavenger may be added to the polyolefin-based resin particles in advance or at the same time as the melt extrusion. Preferably, the radical scavenger is a compound having an effect of scavenging radicals such as a polymerization inhibitor (including polymerization retardant), a chain transfer agent, an antioxidizing agent and a hindered amine light stabilizers, and hard to dissolve in water.

Examples of the polymerization inhibitor include phenol polymerization inhibitors, nitroso polymerization inhibitors, aromatic amine polymerization inhibitors, phosphite ester polymerization inhibitors and thioether polymerization inhibitors such as t-butylhydroquinone, para-methoxyphenol, 2,4-dinitrophenol, t-butylcatechol, sec-propylcatechol, N-methyl-N-nitrosoaniline, N-nitrosophenylhydroxylamine, triphenyl phosphite, tris(nonylphenyl phosphite), triethyl phosphite, tris(2-ethylhexyl) phosphite, tridecyl phosphite, tris(tridecyl) phosphite, diphenyl mono(2-ethylhexyl) phosphite, diphenyl monodecyl phosphite, diphenyl mono(tridecyl) phosphite, dilauryl hydrogen phosphite, tetraphenyl dipropyleneglycol diphosphite and tetraphenyl tetra(tridecyl) pentaerythritol tetraphosphite.

Examples of the chain transfer agent include β-mercaptopropionic acid 2-ethylhexyl ester, dipentaerythritol hexakis (3-mercaptopropionate) and tris[(3-mercaptopropionyloxy)-ethyl]isocyanurate.

Examples of the antioxidizing agent include phenol antioxidizing agents, phosphorus antioxidizing agents and amine antioxidizing agents such as 2,6-di-t-butyl-4-methylphenol (BHT), n-octadecyl-3-(3,5-di-t-butyl-4-hydroxyphenyl)propionate, pentaerythrityl-tetrakis[3-(3,5-di-t-butyl-4-hydroxyphenyl)propionate], 1,3,5-tris(3,5-di-tert-butyl-4-hydroxybenzyl)isocyanurate, 1,3,5-trimethyl-2,4,6-tris(3,5-di-t-butyl-4-hydroxybenzyl)benzene, 3,9-bis[2-{3-(3-t-butyl-4-hydroxy-5-methylphenyl)propionyloxy}-1,1-dimethylethyl]-2,4,8,10-tetraoxaspiro[5.5]undecane, distearyl pentaerythritol diphosphite, tris(2,4-di-t-butylphenyl)phosphite, bis(2,4-di-t-butylphenyl)pentaerythritol diphosphite, tetrakis(2,4-di-t-butylphenyl) 4,4'-biphenylene diphosphonite, bis(2-t-butyl-4-methylphenyl)pentaerythritol diphosphite, 2,4,8,10-tetra-t-butyl-6-[3-(3-methyl-4-hydroxy-5-t-butylphenyl)propoxy]dibenzo[d,f][1,3,2]dioxaphosphepin, phenyl-1-naphthylamine, octylated diphenylamine, 4,4-bis(α,α-dimethylbenzyl)diphenylamine and N,N'-di-2-naphthyl-p-phenylenediamine.

Examples of the hindered amine light stabilizers include bis(2,2,6,6-tetramethyl-4-piperidyl)sebacate, bis(1,2,2,6,6-pentamethyl-4-piperidyl)sebacate and bis(1,2,2,6,6-pentamethyl-4-piperidyl)-2-(3,5-di-t-butyl-4-hydroxybenzyl)-2-n-butylmalonate.

Preferably, 0.005 to 0.5 parts by weight of the radical scavenger is used with respect to 100 parts by weight of the polyolefin-based resin particles.

In addition, the polyolefin-based resin particles may contain a foam regulator such as talc, calcium silicate, calcium stearate, synthetic or naturally produced silicon dioxide, ethylenebisstearic acid amide and methacrylic acid ester-based copolymer; a flame retardant such as hexabromocyclododecane and triallyl isocyanurate hexabromide; and a colorant such as carbon black, iron oxide and graphite.

Next, the micropellets are dispersed in an aqueous medium in a polymerization vessel and impregnated with styrene-based monomer for polymerization.

Examples of the aqueous medium include water, and a mixed medium of water and a water-soluble solvent (for example, alcohol).

For the styrene-based monomer, both styrene and a substituted styrene (substituent includes lower alkyl, halogen atom (in particular, chlorine atom), and the like) may be used. Examples of the substituted styrene include chlorstyrene, vinyltoluene such as p-methylstyrene and α-methylstyrene. Out of them, styrene is generally preferable. In addition, for the styrene-based monomer, may be used a mixture of styrene and the substituted styrene, a mixture of styrene and a small amount of comonomer that can be copolymerized with styrene (for example, acrylonitrile, alkyl methacrylate ester (number of carbon atoms of alkyl moiety: approximately 1 to 8), monoalkyl maleate or dialkyl maleate (number of carbon atoms of alkyl moiety: approximately 1 to 4), divinylbenzene, ethyleneglycol monoacrylate, ethyleneglycol diacrylate, ethyleneglycol methacrylate, maleic anhydride, N-phenylmaleide, or the like). It is preferable that the styrene accounts for a major amount (50% by weight or more, for example) of these mixtures.

A solvent (plasticizer) such as toluene, xylene, cyclohexane, ethyl acetate, dioctyl phthalate and tetrachlorethylene may be added to the styrene-based monomer.

The amount of the styrene-based monomer to use is 110 to 730 parts by weight with respect to 100 parts by weight of the polyolefin-based resin particles. More preferably, the amount is 120 to 560 parts by weight, and even more preferably the amount is 140 to 450 parts by weight.

When the amount of the styrene-based monomer to use is more than 730 parts by weight, the styrene-based monomer may fail to be involved in the impregnation of the polyolefin-based resin particles to generate particles consisting only of polystyrene-based resin. Besides, the resistance to chemicals as well as the resistance to cracking of the expanded molded articles may be reduced. On the other hand, when the amount is less than 110 parts by weight, the ability of the expandable resin particles to retain a blowing agent may be reduced. As a result of the reduction, high expansion will be difficult. In addition, the stiffness of the expanded molded articles may be reduced.

The impregnation of the polyolefin-based resin particles with the styrene-based monomer may be carried out at the same time as the polymerization or before starting the polymerization. It is however preferable that the impregnation is carried out at the same time as the polymerization. When the polymerization is carried out after the impregnation, the polymerization of the styrene-based monomer is more likely in the vicinity of the surfaces of the polyolefin-based resin particles, and the styrene-based monomer not involved in the impregnation of the polyolefin-based resin particles may be independently polymerized to generate a large amount of polystyrene-based resin fine particles.

When the impregnation is carried out at the same time as the polymerization, the polyolefin-based resin particles with respect to which the above-specified content is calculated mean particles composed of the polyolefin-based resin, the styrene-based monomer involved in the impregnation, and the polystyrene-based resin derived from the styrene-based monomer involved in the impregnation and already polymerized.

In order to maintain the content to 0 to 35% by weight, the styrene-based monomer may be added into the aqueous medium in the polymerization vessel successively or intermittently. In particular, it is preferable to add the styrene-based monomer into the aqueous medium gradually.

For the polymerization of the styrene-based monomer, an oil-soluble radical polymerization initiator may be used. As the polymerization initiator, any polymerization initiator generally used for polymerization of styrene-based monomer can be used. Examples thereof include organic peroxides such as benzoyl peroxide, lauroyl peroxide, t-butyl peroxyoctoate, t-hexyl peroxyoctoate, t-butyl peroxybenzoate, t-amyl peroxybenzoate, t-butyl peroxypivalate, t-butyl peroxyisopropyl carbonate, t-hexyl peroxyisopropyl carbonate, t-butyl peroxy-3,3,5-trimethylcyclohexanoate, di-t-butyl peroxyhexahydrotelephtalate, 2,2-di-t-butyl peroxybutane, di-t-hexyl peroxide and dicumyl peroxide; and azo compounds such as azobisisobutylonitrile and azobisdimethylvaleronitrile. These oil-soluble radical polymerization initiators may be used independently or in combination.

As the method for adding a polymerization initiator into the aqueous medium in the polymerization vessel, various kinds of methods may be mentioned. Examples thereof include (a) a method in which the polymerization initiator is dissolved and contained in the styrene-based monomer in a vessel different from the polymerization vessel, and then the styrene-based monomer is fed to the polymerization vessel;

(b) a method in which the polymerization initiator is dissolved in some of the styrene-based monomer, a solvent such as isoparaffin or a plasticizer to prepare a solution, and then the solution and a predetermined amount of the styrene-based monomer are fed to the polymerization vessel at the same time; and (c) a method in which the polymerization initiator is dispersed in an aqueous medium to prepare a dispersion, and then the dispersion and the styrene-based monomer are fed to the polymerization vessel.

Preferably, the polymerization initiator is, in general, used at a proportion of 0.02 to 2.0% by weight with respect to the total amount of the styrene-based monomer to use.

Preferably, a water-soluble radical polymerization inhibitor is dissolved in the aqueous medium. The water-soluble radical polymerization inhibitor can inhibit polymerization of the styrene-based monomer in the surfaces of the polyolefin-based resin particles. At the same time, this inhibitor can prevent the styrene-based monomer suspended in the aqueous medium from being independently polymerized to reduce generation of polystyrene-based resin fine particles.

As the water-soluble radical polymerization inhibitor, a polymerization inhibitor that can dissolve in an amount of 1 g or more in 100 g of water may be used. Examples thereof include thiocyanates such as ammonium thiocyanate, zinc thiocyanate, sodium thiocyanate, potassium thiocyanate and aluminium thiocyanate; nitrites such as sodium nitrite, potassium nitrite, ammonium nitrite, calcium nitrite, silver nitrite, strontium nitrite, cesium nitrite, barium nitrite, magnesium nitrite, lithium nitrite and dicyclohexylammonium nitrite; water-soluble sulfur containing organic compounds such as mercaptoethanol, monothiopropylene glycol, thioglycerol, thioglycolic acid, thiohydracrylic acid, thiolactic acid, thiomalic acid, thioethanolamine, 1,2-dithioglycerol, 1,3-dithioglycerol; and ascorbic acid and sodium ascorbate. Out of them, nitrites are particularly preferable.

Preferably, the water-soluble radical polymerization inhibitor is used in an amount of 0.001 to 0.04 parts by weight with respect to 100 parts by weight of the water in the aqueous medium.

Preferably, a dispersant is added to the aqueous medium. Examples of the dispersant include organic dispersants such as partially saponified polyvinyl alcohol, polyacrylate, polyvinylpyrrolidone, carboxymethylcellulose and methylcellulose; and inorganic dispersants such as magnesium pyrophosphate, calcium pyrophosphate, calcium phosphate, calcium carbonate, magnesium phosphate, magnesium carbonate and magnesium oxide. Out of them, inorganic dispersants are preferable.

When inorganic dispersants are used, it is preferable to use a surfactant in combination. Examples of the surfactant include sodium dodecylbenzenesulfonate and sodium α-olefinsulfonate.

The shape and the structure of the polymerization vessel are not particularly limited, as long as they are conventionally used for suspension polymerization of styrene-based monomer and equipped with a stirring wing.

The shape of the stirring wing is not particularly limited, and specific examples thereof include paddle wings such as V-type paddle wing, Furrydragon wing, inclined paddle wing, flat paddle wing and Pullmargine wing; turbine wings such as turbine wing and fan turbine wing; and propeller wings such as marine propeller wing. Out of these stirring wings, paddle wing is preferable. The stirring wing may be a single stage wing or a multiple stage wing. The polymerization vessel may be provided with a baffle.

The temperature of the aqueous medium for the polymerization of the styrene-based monomer in the micropellets is not particularly limited, and is preferably in a range of −30 to +20° C. of the melting point of the polyolefin-based resin to use. More specifically, the temperature of the aqueous medium is preferably 70 to 140° C., and more preferably 80 to 130° C. Moreover, the temperature of the aqueous medium may be a constant temperature during the term from initiation to completion of the polymerization of the styrene-based monomer, or may be raised stepwise. When the temperature of the aqueous medium is raised, the temperature is preferably raised at a temperature raising rate of 0.1 to 2° C./minute.

Further, when particles composed of cross-linked polyolefin-based resin are used, the cross-linking may be performed in advance before the impregnation with the styrene-based monomer, may be performed at the same time as the impregnation of the micropellets with the styrene-based monomer and the polymerization or may be performed after the impregnation of the micropellets with the styrene-based monomer and the polymerization.

Examples of a cross-linking agent used for cross-linking the polyolefin-based resin include organic peroxides such as 2,2-di-t-butyl-peroxybutane, dicumyl peroxide and 2,5-dimethyl-2,5-di-t-butyl peroxyhexane. These cross-linking agents may be used independently or in combination of two or more kinds thereof. Preferably, the cross-linking agent is, in general, used in an amount of 0.05 to 1.0 part by weight with respect to 100 parts by weight of the polyolefin-based resin particles (micropellets).

Examples of the method for adding the cross-linking agent include a method in which the cross-linking agent is directly added to the polyolefin-based resin particles; a method in which the cross-linking agent is dissolved in a solvent, a plasticizer or the styrene-based monomer, and then the solution is added; and a method in which the cross-linking agent is dispersed in water, and then the dispersion is added. Out of them, preferable is the method in which the cross-linking agent is dissolved in the styrene-based monomer, and then the solution is added.

Thus, modified resin particles are obtained.

(Amount of Water and Pentane)

The amount of the water contained in the expandable composite resin particles is 500 to 5000 ppm. When the amount of the water is less than 500 ppm and the particles are pre-expanded, pre-expanded particles having very fine cells in the surface and the inside account for the majority, and cell size variation tends to be very significant. When the amount of the water is more than 5000 ppm and the particles are pre-expanded, pre-expanded particles having very rough and large cells in the surface and the inside account for the majority, and the appearance of the expanded molded articles tends to be very poor. Preferably, the amount of the water is 1000 to 4500 ppm.

The pentane can be selected from i-pentane, n-pentane and a mixture thereof. In particular, it is preferable to use pentane containing i-pentane and n-pentane at a ratio of 20:80 to 100:0.

The amount of the pentane included in the expandable composite resin particles is 7.5 to 11.0% by weight. When the content percentage of the pentane is less than 7.5% by weight, the expandability of the expandable composite resin particles may be reduced. When the expandability is reduced, it will be difficult to obtain pre-expanded particles of a higher bulk factor and a lower bulk density, and expanded molded articles to be obtained by molding the pre-expanded particles in a mold may have a reduced fusion factor to have reduced resistance to cracking. On the other hand, when the content percentage is more than 11.0% by weight, the cell size in the pre-expanded particles will easily be too large, and therefore the moldability thereof may be reduced and expanded molded articles to be obtained therefrom may be reduced in strength properties such as compression strength and bending strength. More preferably, the content percentage of the pentane is in a range of 8.5 to 10.0% by weight.

The expandable composite resin particles containing a specified amount of the pentane are obtained by a method in which the impregnation with the pentane is carried out in an aqueous medium (wet impregnation) or a method in which the impregnation is carried out in the absence of a medium (dry impregnation).

The method for adjusting the water contained in the expandable composite resin particles to a specified amount is not particularly limited, and the adjustment is performed by a commonly known method. For example, when the water content of the composite resin particles is small, the composite resin particles are dispersed in an aqueous medium, and the medium is retained at 110 to 140° C. for 2 to 5 hours while sealed to give water to the composite resin particles. Preferably, a dispersant is added to the aqueous medium. When the water content of the composite resin particles is large, the composite resin particles are dried with a dryer to adjust the amount of the water. In the case of a batchwise pneumatic conveying dryer, for example, the water can be adjusted to a specified amount by application of air at 10 to 70° C., more preferably at 20 to 60° C. for 0.5 to 3 hours. Alternatively, a large amount of water may be included in the composite resin particles, and then dried with a drier to adjust the amount of the water. Alternatively, the composite resin particles may be placed in an atmosphere in which temperature and humidity are controlled to constant levels for a predetermined period of time to adjust the amount of the water.

Further, when a large amount of the composite resin particles are produced, the composite resin particles produced may be pneumatically transported to another container. In this case, composite resin particles containing a specified amount of water can be obtained by adjusting the air temperature (referred to as pneumatic temperature) and the flow rate in the pneumatic transportation of the composite resin particles. For example, the water can be simply and easily adjusted to a specified amount by transportation at a pneumatic temperature of 10 to 70° C., preferably 20 to 60° C. and at a flow rate of 5 to 30 m/second, preferably 10 to 20 m/second. When the pneumatic temperature is less than 10° C., the water content may be more than 5000 ppm, and when the pneumatic temperature is more than 70° C., the water content may be less than 500 ppm. On the other hand, when the flow rate is less than 5 m/second, the transportation of the composite resin particles in a vertical direction may be difficult or the water content may be less than 500 ppm. When the flow rate is more than 30 m/second, though it is not inconvenient, a larger blower is uneconomically needed or the water content may be more than 5000 ppm.

As described above, composite resin particles containing water adjusted to a specified amount are impregnated with a specified amount of pentane by wet impregnation or dry impregnation to obtain expandable composite resin particles containing specified amounts of water and pentane.

(Pre-Expanded Particles and Expanded Molded Articles)

Next, a method for obtaining pre-expanded particles and eventually expanded molded articles from the expandable composite resin particles will be described.

The pre-expanded particles can be obtained by heating the expandable composite resin particles with a heating medium such as steam according to need to pre-expand the particles to a predetermined bulk density.

Preferably, the pre-expanded particles have a bulk factor of 5 to 70 (bulk density: 0.014 to 0.2 $g/cm^3$). More preferably, the bulk factor is 10 to 60. When the bulk factor is more than 70, the closed cell ratio of the pre-expanded particles may be reduced, and expanded molded articles to be obtained by expanding the pre-expanded particles may have reduced strength. On the other hand, when the bulk factor is less than 5, expanded molded articles to be obtained by expanding the pre-expanded particles may have increased weight.

The expandable composite resin particles before the pre-expansion are refrigerated or frozen for storage. Specifically, the storage temperature is 5° C. or less. Preferably, the storage temperature is −5° C. or less. More preferably, the storage temperature is −15° C. or less.

Further, expanded molded articles having a desired shape can be obtained by pouring the pre-expanded particles into a mold of a molding machine, and secondarily expanding the same by heating to fuse and integrate the pre-expanded particles. For the molding machine, an EPS molding machine, which is used for producing expanded molded articles from polystyrene-based resin pre-expanded particles, can be used.

The resulting expanded molded articles can be used for shock-absorbers (cushioning) for home electric appliances; and containers for conveying electronic components, various industrial materials and foods. Also, the expanded molded articles can be suitably used for core materials for vehicle bumpers, impact energy absorbers such as interior cushioning materials of doors.

EXAMPLES

Hereinafter, the present invention will be described with reference to examples; however, the present invention is not limited to the examples.

<Method for Producing Pre-Expanded Particles>

Expandable resin particles are stored in a freezer (set to −25° C.) for 168 hours, and then allowed to stand under an environment of a room temperature of 25° C. and a humidity of 50% for 1 hour, and then pre-expanded under the conditions described below.

Into an ambient-pressure pre-expander (having a capacity of 50 L) preheated with steam, 500 to 2000 g of the expandable resin particles are poured, and steam is introduced to a setting of approximately 0.02 MPa under stirring and, at the same time, air is fed to expand the particles to a predetermined bulk density (bulk factor) over approximately 2 or 3 minutes.

<Conditions for Molding in a Mold>

The pre-expanded particles are poured into a mold in a molding machine, and heated with steam and cooled under the following conditions, whereupon expanded molded articles are taken out of the mold.

Molding machine: ACE-3SP, product by Sekisui Machinery Co., Ltd.

Mold dimension: 300 mm (width)×400 mm (length)×50 mm (thickness)

Molding Conditions Heating of mold: 5 seconds
  One-side heating: 10 seconds
  Reverse one-side heating: 5 seconds
  Both-side heating: 20 seconds
  Water cooling: 20 seconds
  Vacuum cooling: until the maximum surface pressure falls to 0.01 $kgf/cm^2$ or less
  Steam pressure setting: 0.6 to 1.0 $kgf/cm^2$ <Bulk Density and Bulk Factor of Pre-Expanded Particles>

Approximately 5 g of the pre-expanded particles are weighted for the weight (a) to two places of decimals. Next, the pre-expanded particles weighted are put into a 500 $cm^3$ measuring cylinder having a minimum memory unit of 5 $cm^3$. Thereto, a pressing tool composed of a circular resin plate having a diameter slightly smaller than the diameter of the measuring cylinder and a bar-like resin plate having a width of approximately 1.5 cm and a length of approximately 30 cm fixed upright to the center of the circular resin plate is applied to read the volume (b) of the pre-expanded particles. The bulk density ($g/cm^3$) of the pre-expanded particles is determined according to the formula (a)/(b). The bulk factor is an inverse of the bulk density, that is, the formula (b)/(a).

<Method for Evaluating Cell Size Variation of Pre-Expanded Particles>

According to the test method of ASTM D2842-69, the pre-expanded particles are measured for the average cell size as follows.

The expandable resin particles are pre-expanded to a bulk factor of 30 or 50, and arbitrary 30 particles are picked out of the pre-expanded particles, each of which is divided from the surface through the center into two with a razor. The cross section of a slice of each particle divided into two is magnified to 15 to 30 times (200 times in some cases) and photographed with a scanning electron microscope (S-3000N, product by Hitachi, Ltd.)

The images photographed are printed on A4 paper sheets on a one image per sheet basis, and two straight lines passing through the center of each image are drawn so as to be perpendicular to each other to measure the lengths of these straight lines and the number of cells overlapping (or contacting) the straight lines.

The average chord length (t) of the cells is calculated from the result according to the following formula. The arbitrary straight lines are drawn so as to allow as few cells as possible to contact with the lines only at a point (when contacting, the cell is counted).

Average chord length t=length of line/(number of cells×magnification for photograph)

Then, the cell size is calculated according to the following formula.

Cell size $d=t/0.616$

Further, the arithmetic mean of all the images is determined as the average cell size.

Average cell size $D$ (mm)=(cell size $n=1$+cell size $n=2+\ldots$+cell size $n=30$)/30

Next, the ratio (U) between the average cell size (D) and the standard deviation (s) representing cell size variation is calculated (U=s/D) to be determined as the degree of cell size variation. The particles are evaluated as ⊚ when the value of U is less than 0.5, ○ when the value of U is 0.5 or more and less than 0.8, and x when the value of U is 0.8 or more.

<Measurement for Water Content>

Composite resin particles or expandable composite resin particles in an amount of 5 g are immersed in 200 ml of methanol and stirred for approximately 1 minute to substitute water in the surfaces of the particles. Thereafter, the particles are separated from the methanol with a vacuum filtration device and air-dried for 5 minutes. Thereafter, a sample is precisely weighed to be 0.5 g and measured by Karl Fischer technique at a heating temperature of 150° C. with a trace level moisture determination device (AQ-2100, product by Hiranuma Sangyo Co., Ltd.)

<Measurement for Gas Content (Pentane and Butane as Blowing Agent)>

Expandable resin particles are precisely weighed to be 5 to 20 mg as a measurement sample. The measurement sample is set in a pyrolytic furnace (PYR-1A, product by Shimadzu Corporation) maintained at 180 to 200° C., sealed and heated over 120 seconds to cause the sample to release the blowing agent component. The blowing agent component released is applied to a gaschromatograph (GC-14B, product by Shimadzu Corporation, detector: FID) under the conditions described below to obtain a chart of the blowing agent component. The content of the blowing agent (% by weight) in the expandable resin particles is calculated from the obtained chart based on a calibration curve of the blowing agent component prepared in advance.

Measurement Conditions of Gaschromatograph
Column: "Shimalite 60/80 NAW" (φ 3 mm×3 m), product by Shinwa Chemical Industries LTD.
Column temperature: 70° C.,
Detector temperature: 110° C.
Inlet temperature: 110° C.
Carrier gas: nitrogen
Carrier gas flow rate: 60 ml/minute <Measurement for Polystyrene-Based Resin Ratio>

The measurement is to measure pre-expanded particles or expanded molded articles for the polystyrene ratio by determining the absorbance ratio ($A_{698}/A_{2850}$) in the manner described below.

In the case of pre-expanded particles, arbitrary 10 particles are picked, each of which is divided from the surface through the center into two with a razor. The cross section of a slice of each particle divided into two is subjected to ATR-infrared spectroscopy to obtain the infrared absorption spectrum.

In the case of expanded molded articles, arbitrary 10 particles are picked out of the expanded molded articles, each of which is divided from the surface through the center into two with a razor. The cross section of a slice of each particle divided into two is subjected to ATR-IR spectroscopy to obtain the infrared absorption spectrum.

Here, for measuring a central part of a particle, each pre-expanded particle is halved (for example, a pre-expanded particle having a particle diameter of 5 mm is cut into 2.5±0.5 mm), and an ATR prism is brought into close contact with the cross section thereof.

From the respective infrared absorption spectra, the respective absorbance ratios ($A_{698}/A_{2850}$) are calculated, and the minimum absorbance ratio and the maximum absorbance ratio are excluded. Then, the arithmetic average of the remaining 8 absorbance ratios is determined as the absorbance ratio ($A_{698}/A_{2850}$). The measurement for the absorbance ratio is performed with a measuring apparatus sold by Nicolet Instrument Corp. under the trade name of "Fourier transformation infrared spectrometer MAGNA560".

Standard samples are obtained by the following method. First, polystyrene-based resin and polyethylene-based resin each having the same composition as those included in the composite resin particles to be measured are precisely weighed to be 2 g in total in such a manner that the composition ratio therebetween (polystyrene-based resin/polyethylene-based resin) will be as follows.

Composition ratio (PS/PE by weight): 0/10=only PE-based resin, 1/9, 2/8, 3/7, 4/6, 5/5, 6/4, 7/3, 8/2, 10/0=only PS-based resin The weighed is heated and kneaded with a small size injection molding machine under the conditions described below, and molded into a cylindrical shape having a diameter of 25 mm and a height of 2 mm to obtain each standard sample.

As the small size injection molding machine, for example, a machine sold by CSI under the trade name of "CS-183" can be used, and the molding can be performed under the following conditions, for example.

Figure 5:
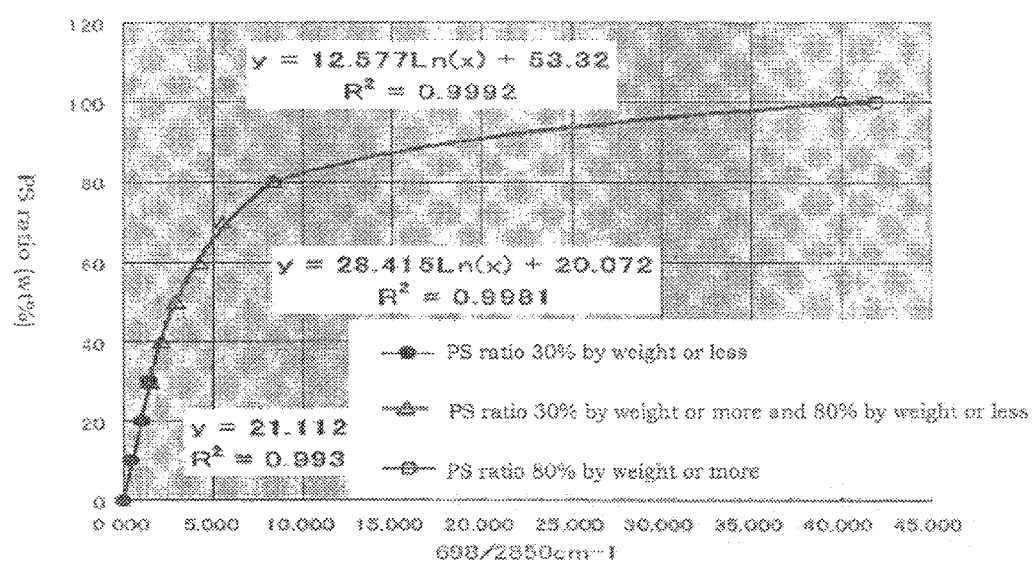
FIG. 5 is a graph showing the relationship between a polystyrene-based resin ratio (% by weight) and an absorbance ratio ($A_{698}/A_{2850}$).

Injection molding conditions: heating temperature of 200 to 250° C., kneading time of 10 minutes The calibration curve shown in FIG. 5 is obtained by measuring the standard samples at the above-mentioned ratios for the absorbance ratio with the above-described measuring apparatus and graphing the relationship between the polystyrene-based resin ratio (% by weight) and the absorbance ratio ($A_{698}/A_{2850}$).

In FIG. 5, when the polystyrene-based resin ratio is 30% by weight or less, the calibration curve is approximated according to the following formula (1):

$$Y=21.112X \quad (1)$$

In FIG. 5, when the polystyrene-based resin ratio is 30% by weight or more and less than 80% by weight, the calibration curve is approximated according to the following formula (2):

$$Y=28.415 \ln(X)+20.072 \quad (2)$$

In FIG. 5, when the polystyrene-based resin ratio is 80% by weight or more, the calibration curve is approximated according to the following formula (3):

$$Y = 12.577 \ln(X) + 53.32 \quad (3)$$

In the formula, X represents the absorbance ratio $A_{698}/A_{2850}$), and Y represents the polystyrene-based resin ratio.

The polystyrene-based resin ratio (% by weight) in the samples of the pre-expanded particles or the expanded molded articles are calculated based on the calibration curve in FIG. 5.

Example 1 a) Production of Polyethylene-Modified Styrene-Based Resin Particles of Polyethylene-Based Resin (PE)/Polystyrene-Based Resin (PS)=30/70

Ethylene-vinyl acetate copolymer resin particles (LV-115, product by Japan Polyethylene Corporation) were heated and mixed with an extruder, and granulated and pelletized by in-water cutting (the ethylene-vinyl acetate copolymer resin particles were adjusted to weigh 80 mg per 100 particles). Into a 100-L autoclave equipped with a stirrer, 10.5 kg of the ethylene-vinyl acetate copolymer resin particles were poured, and 45 kg of pure water as an aqueous medium, 315 g of magnesium pyrophosphate and 1.6 g of sodium dodecyl-benzenesulfonate were added and stirred to suspend the mixture in the aqueous medium. The suspension was retained for 10 minutes, and then heated up to a temperature of 60° C.

Subsequently, 4.5 kg of styrene monomer having 5.4 g of dicumyl peroxide dissolved therein was added to the suspension dropwise over 30 minutes. After the dropwise addition, the suspension was retained at 60° C. for 30 minutes to allow the polyethylene-based resin particles to absorb the styrene monomer. After the absorption, the temperature was raised to 130° C., and stirring was continued at the same temperature for 1 hour and 45 minutes. Thereafter, the temperature was lowered to 90° C., and into the suspension, 11.4 g of sodium dodecylbenzenesulfonate was added, and then 6.2 kg of styrene monomer having 39.2 g of benzoyl peroxide and 4.9 g of t-butyl peroxybenzoate as polymerization initiators and 98.7 g of dicumyl peroxide as a cross-linking agent dissolved therein was added dropwise over 2 hours. Subsequently, 13.8 kg of styrene monomer having 175 g of ethylenebisstearic acid amide dissolved therein was added dropwise over 2 hours. After the dropwise addition, the suspension was retained at 90° C. for 1 hour, and then heated up to a temperature of 143° C. and retained at the same temperature for 2 hours to complete polymerization. Thereafter, the suspension was cooled to normal temperature, and polyethylene-modified styrene-based resin particles were taken out.

Here, the styrene monomer was used in an amount of 233 parts by weight with respect to 100 parts by weight of the ethylene-vinyl acetate copolymer resin particles.

b) Adjustment of Water Content

The polyethylene-modified styrene-based resin particles obtained as described above were dehydrated with a basket centrifuge, and the polyethylene-modified styrene-based resin particles dehydrated were dried in a cylindrical dryer with flowing air at normal temperature for 3 hours. The polyethylene-modified styrene-based resin particles obtained as described above had a water content of 583 ppm.

c) Impregnation with Blowing Agent (Wet Impregnation)

Into a 5-L autoclave equipped with a stirrer, 2 kg of the water-containing polyethylene-modified styrene-based resin particles obtained as described above were poured, and then 2 kg of pure water as an aqueous medium and 2 g of sodium dodecylbenzenesulfonate were added and stirred to suspend the mixture in the aqueous medium. The suspension was retained for 10 minutes, and then 240 g of pentane containing 97% or more i-pentane (product named isopentane, manufactured by SKS K.K.: Gas a) was added thereto. Subsequently, the suspension was heated up to a temperature of 60° C. and kept stirred at the same temperature for 3 hours. Thereafter, the temperature was cooled to normal temperature, and the particles were taken out. The expandable composite resin particles obtained as described above had a pentane content of 8.3% by weight and a water content of 661 ppm.

d) Storage

In a 2-L aluminum hermetic container, approximately 1000 g of the expandable composite resin particles obtained as described above were packed and stored in a freezer set to −25° C. for 168 hours.

e) Pre-Expansion

After stored in the above-described manner, the expandable composite resin particles still packed in the 2-L aluminum hermetic container were left to stand under an environment of a room temperature of 25° C. and a humidity of 50% for 1 hour, and then the expandable composite resin particles were pre-expanded with the target bulk factor set at 50 under the pre-expansion conditions described above to obtain pre-expanded particles having a bulk factor of 50.

The resulting pre-expanded particles were evaluated according to the method for evaluating cell size variation of pre-expanded particles described above.

Table 1 summarizes the results.

f) Expansion-Molding

The pre-expanded particles obtained as described above were stored under an environment of a room temperature of 25° C. and a humidity of 50% for 1 day, and then expanded and molded under the conditions for molding in a mold described above to obtain expanded molded articles having an expansion factor of 50. The resulting expanded molded articles were cut into a piece of 50×75 mm, from which approximately 5 mm of an outermost surface was removed, and then the surface revealed was sliced to have a thickness of approximately 1 to 2 mm. The slice having a size of 50×75×1 to 2 (t) mm was scanned with a scanner (GT-S600, product by Seiko Epson Corporation), and an image saved therein is shown in FIG. 1.

Example 2

Figure 2:
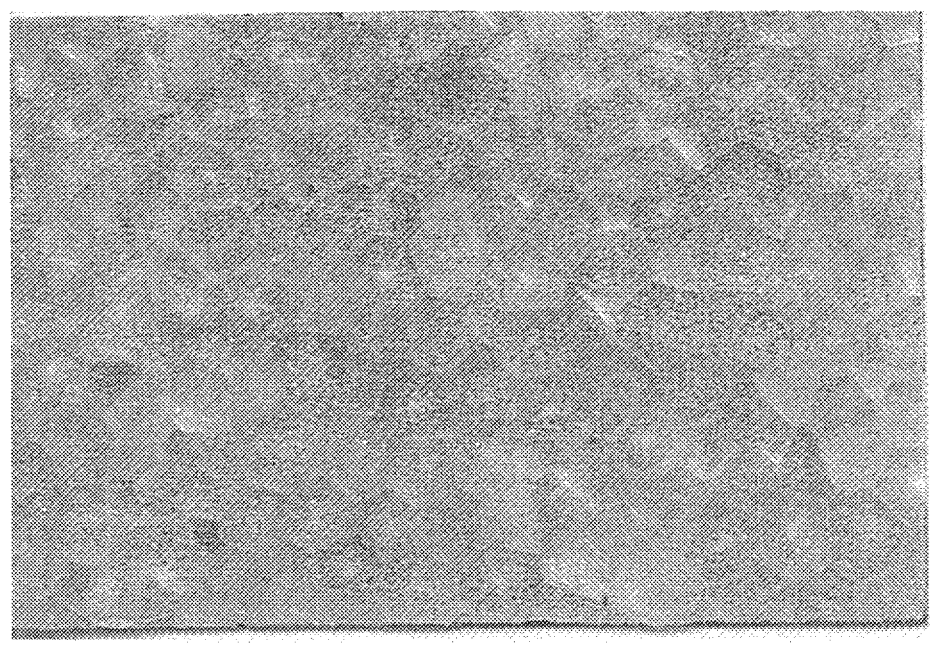
FIG. 2 is a scanner image of a sliced surface of a molded article obtained in Example 2.

Polyethylene-modified styrene-based resin particles were produced in the same manner as in a) of Example 1; the water content was adjusted in the same manner as in b) of Example 1 except that the drying time was 0.5 hours; impregnation with a blowing agent was carried out in the same manner as in c) (wet impregnation) of Example 1 except that 260 g of pentane containing 97% or more i-pentane (product named isopentane, manufactured by SKS K.K.: Gas a) was used; and storage, pre-expansion and expansion-molding were carried out in the same manner as in d), e) and f) of Example 1, respectively to obtain expanded molded articles. Table 1 shows the measurement results. In addition, as in the case of Example 1, a scanner image of a sliced surface of resulting expanded molded articles is shown in FIG. 2.

The polystyrene-based resin ratio at central parts of the pre-expanded particles having a bulk factor of 50 was 68% by weight (almost the same as the blending ratio).

Example 3 a) Production of Polyethylene-Modified Styrene-Based Resin Particles of Polyethylene-Based Resin (PE)/Polystyrene-Based Resin (PS)=40/60

Ethylene-vinyl acetate copolymer resin particles (LV-115, product by Japan Polyethylene Corporation) were heated and mixed with an extruder, and granulated and pelletized by in-water cutting (the ethylene-vinyl acetate copolymer resin particles were adjusted to weigh 80 mg per 100 particles). Into a 100-L autoclave equipped with a stirrer, 14 kg of the ethylene-vinyl acetate copolymer resin particles were poured, and 45 kg of pure water as an aqueous medium, 315 g of magnesium pyrophosphate and 1.6 g of sodium dodecylbenzenesulfonate were added and stirred to suspend the mixture in the aqueous medium. The suspension was retained for 10 minutes, and then heated up to a temperature of 60° C.

Subsequently, 6.0 kg of styrene monomer having 7.2 g of dicumyl peroxide dissolved therein was added to the suspension dropwise over 30 minutes. After the dropwise addition, the suspension was retained at 60° C. for 30 minutes to allow the polyethylene-based resin particles to absorb the styrene monomer. After the absorption, the temperature was raised to 130° C., and stirring was continued at the same temperature for 2 hours. Thereafter, the temperature was lowered to 90° C., and into the suspension, 11.4 g of sodium dodecylbenzenesulfonate was added, and then 5 kg of styrene monomer having 39.9 g of benzoyl peroxide and 3.2 g of t-butyl peroxybenzoate as polymerization initiators and 102.2 g of dicumyl peroxide as a cross-linking agent dissolved therein was added dropwise over 1.5 hours. Subsequently, 10 kg of styrene monomer having 105 g of ethylenebisstearic acid amide dissolved therein was added dropwise over 1.5 hours. After the dropwise addition, the suspension was retained at 90° C. for 1 hour, and then heated up to a temperature of 143° C. and retained at the same temperature for 2.5 hours to complete polymerization. Thereafter, the temperature was cooled to normal temperature, and the particles were taken out.

Here, the styrene monomer was used in an amount of 150 parts by weight with respect to 100 parts by weight of the ethylene-vinyl acetate copolymer resin particles.

The water content was adjusted in the same manner as in b) of Example 1; impregnation with a blowing agent was carried out in the same manner as in c) (wet impregnation) of Example 1 except that 280 g of pentane containing 97% or more i-pentane (product named isopentane, manufactured by SKS K.K.: Gas a) was used; storage was carried out in the same manner as in d) of Example 1; pre-expansion was carried out in the same manner as in e) of Example 1 except that the bulk factor was 30; and expansion-molding was carried out in the same manner as in f) of Example 1 to obtain expanded molded articles. Table 1 shows the measurement results.

Example 4

Polyethylene-modified styrene-based resin particles were produced in the same manner as in a) of Example 3; the water content was adjusted in the same manner as in b) of Example 1 except that the drying time was 0.5 hours; impregnation with the blowing agent was carried out in the same manner as in c) (wet impregnation) of Example 1 except that 280 g of pentane containing 97% or more i-pentane (product named isopentane, manufactured by SKS K.K.: Gas a) was used; storage was carried out in the same manner as in d) of Example 1; pre-expansion was carried out in the same manner as in e) of Example 1 except that the bulk factor was 30; and expansion-molding was carried out in the same manner as in f) of Example 1 to obtain expanded molded articles. Table 1 shows the measurement results.

The polystyrene-based resin ratio at central parts of the pre-expanded particles having a bulk factor of 30 was 62% by weight (almost the same as the blending ratio).

Example 5

Polyethylene-modified styrene-based resin particles were produced in the same manner as in a) of Example 1 and the water content was adjusted in the same manner as in b) of Example 1 except that the drying time was 1 hour.

c) Impregnation with blowing agent (dry impregnation)

Into a 50-L V-type blender, 15 kg of the water-containing polyethylene-modified styrene-based resin particles obtained as described above and 1950 g of pentane containing 97% or more i-pentane (product named isopentane, manufactured by SKS K.K.: Gas a) were poured and stirred for 10 minutes. Subsequently, the mixture was heated up to a temperature of 60° C. and kept stirred at the same temperature for 3 hours. Thereafter, the temperature was cooled to normal temperature, and the particles were taken out. The expandable composite resin particles obtained as described above had a pentane content of 9.2% by weight and a water content of 2178 ppm.

Storage, pre-expansion and expansion-molding were carried out in the same manner as in d), e) and f) of Example 1, respectively. Table 1 shows the measurement results.

Example 6

Polyethylene-modified styrene-based resin particles were produced in the same manner as in a) of Example 1; the water content was adjusted in the same manner as in b) of Example 1; impregnation with a blowing agent was carried out in the same manner as in c) (wet impregnation) of Example 1 except that 240 g of pentane of n-pentane/i-pentane=75/25 to 85/15 (product named pentane, manufactured by Cosmo Oil Co., Ltd.: Gas b) was used; and storage, pre-expansion and expansion-molding were carried out in the same manner as in d), e) and f) of Example 1, respectively. Table 1 shows the measurement results.

Comparative Example 1

Figure 3:
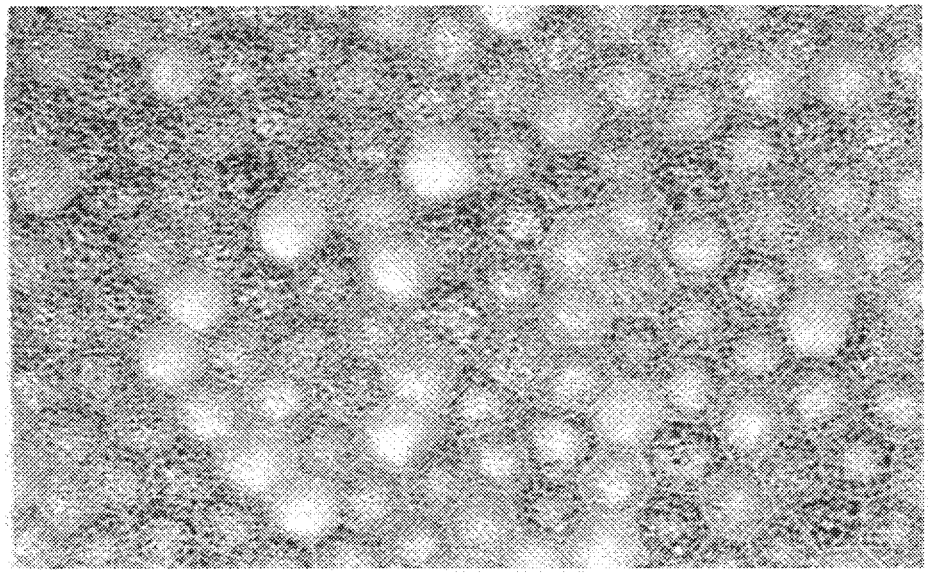
FIG. 3 is a scanner image of a sliced surface of a molded article obtained in Comparative Example 1.

Polyethylene-modified styrene-based resin particles were produced in the same manner as in a) of Example 1; the water content was adjusted in the same manner as in b) of Example 1 except that the drying time was 5 hours; impregnation with a blowing agent was carried out in the same manner as in c) (wet impregnation) of Example 1 except that 280 g of pentane containing 97% or more i-pentane (product named isopentane, manufactured by SKS K.K.: Gas a) was used; and storage, pre-expansion and expansion-molding were carried out in the same manner as in d), e) and f) of Example 1, respectively. Table 1 shows the measurement results. In addition, as in the case of Example 1, a scanner image of a sliced surface of resulting expanded molded articles is shown in FIG. 3.

Comparative Example 2

Expanded molded articles were obtained in the same manner as in Example 1 except that the water content was not adjusted. Table 1 shows the measurement results.

Comparative Example 3

Polyethylene-modified styrene-based resin particles were produced in the same manner as in a) of Example 1; the water content was adjusted in the same manner as in b) of Example 1 except that the drying time was 5 hours; impregnation with a blowing agent was carried out in the same manner as in c) (dry impregnation) of Example 5 except that 1800 g of pentane containing 97% or more i-pentane (product named isopentane, manufactured by SKS K.K.: Gas a) was used; and storage, pre-expansion and expansion-molding were carried out in the same manner as in d), e) and f) of Example 1, respectively. Table 1 shows the measurement results.

Comparative Example 4

Polyethylene-modified styrene-based resin particles were produced in the same manner as in a) of Example 1; the water content was adjusted in the same manner as in b) of Example 1 except that the drying time was 1 hour; impregnation with a blowing agent was carried out in the same manner as in c) (dry impregnation) of Example 5 except that 1500 g of pentane containing 97% or more i-pentane (product named isopentane, manufactured by SKS K.K.: Gas a) was used, and the suspension was heated up to a temperature of 50° C. and kept stirred at the same temperature for 2 hours; and storage was carried out in the same manner as in d) of Example 1. Pre-expansion was supposed to be carried out in the same manner as in e) of Example 1, but it was impossible to expand the particles to a predetermined expansion factor. Table 1 shows the measurement results.

Comparative Example 5

Figure 4:
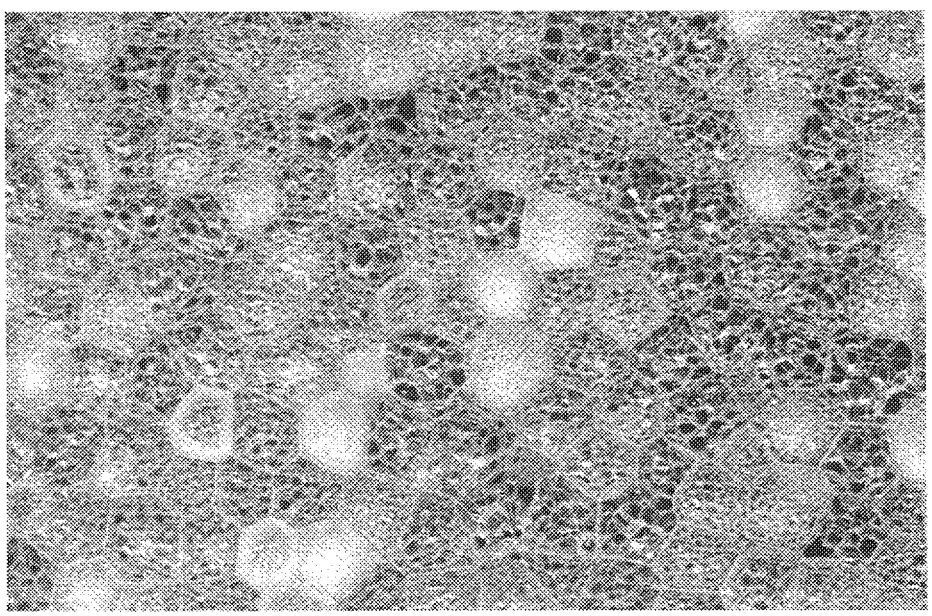
FIG. 4 is a scanner image of a sliced surface of a molded article obtained in Comparative Example 5.

Polyethylene-modified styrene-based resin particles were produced in the same manner as in a) of Example 1; the water content was adjusted in the same manner as in b) of Example 1; impregnation with a blowing agent was carried out in the same manner as in c) (wet impregnation) of Example 1 except that 320 g of pentane of n-pentane/i-pentane=75/25 to 85/15 (product named pentane, manufactured by Cosmo Oil Co., Ltd.: Gas b) was used, and the suspension was heated up to a temperature of 70° C. and kept stirred at the same temperature for 5 hours; and storage, pre-expansion and expansion-molding were carried out in the same manner as in d), e) and f) of Example 1, respectively. Table 1 shows the measurement results. In addition, as in the case of Example 1, a scanner image of a sliced surface of resulting expanded molded articles is shown in FIG. 4.

Comparative Example 6

Polyethylene-modified styrene-based resin particles were produced in the same manner as in a) of Example 1; the water content was adjusted in the same manner as in b) of Example 1 except that the drying time was 2 hours; impregnation with a blowing agent was carried out in the same manner as in c) (wet impregnation) of Example 1 except that 240 g of butane of n-butane/i-butane=60/40 to 70/30 (product named Cosmo butane silver, manufactured by Cosmo Oil Co., Ltd.: Gas c) was used; and storage, pre-expansion and expansion-molding were carried out in the same manner as in d), e) and f) of Example 1, respectively. Table. 1 shows the results.

TABLE 1

| | | Gas impregnation process | Gas | Amount of gas used (wt %) | PE/PS | Water content of modified resin particles (ppm) | Expandable modified resin particles | | Expanded to predetermined factor (Yes or No) | Average cell size (D, mm) | Cell diameter standard deviation (s) | Degree of cell size variation (U = s/D) |
|---|---|---|---|---|---|---|---|---|---|---|---|---|
| | | | | | | | Water content (ppm) | Gas content (wt %) | | | | |
| Examples | 1 | Wet | a | 12 | 30/70 | 583 | 661 | 8.3 | Yes | 0.44 | 0.28 | 0.64○ |
| | 2 | Wet | a | 13 | 30/70 | 4320 | 4056 | 8.6 | Yes | 0.35 | 0.15 | 0.43◎ |
| | 3 | Wet | a | 14 | 40/60 | 612 | 748 | 10.1 | Yes | 0.68 | 0.4 | 0.59○ |
| | 4 | Wet | a | 14 | 40/60 | 4015 | 3891 | 9.8 | Yes | 0.75 | 0.15 | 0.20◎ |
| | 5 | Dry | a | 13 | 30/70 | 2331 | 2178 | 9.2 | Yes | 0.7 | 0.2 | 0.29◎ |
| | 6 | Wet | b | 12 | 30/70 | 721 | 803 | 8.7 | Yes | 0.41 | 0.31 | 0.76○ |
| Comparative Examples | 1 | Wet | a | 14 | 30/70 | 300 | 287 | 10.3 | Yes | 0.74 | 0.84 | 1.14X |
| | 2 | Wet | a | 12 | 30/70 | 5526 | 5703 | 7.8 | Yes | 0.36 | 0.33 | 0.92X |
| | 3 | Dry | a | 12 | 30/70 | 403 | 352 | 8.0 | Yes | 0.28 | 0.24 | 0.86X |
| | 4 | Dry | a | 10 | 30/70 | 1867 | 1805 | 7.1 | No | — | — | — |
| | 5 | Wet | a | 16 | 30/70 | 672 | 650 | 12.8 | Yes | 0.97 | 1.35 | 1.39X |
| | 6 | Wet | c | 12 | 30/70 | 1023 | 1156 | 9.5 | Yes | 0.3 | 0.32 | 1.07X |

In the table:
Gas a is a product named isopentane, manufactured by SKS K.K. (containing 97% or more i-pentane);
Gas b is a product named pentane, manufactured by Cosmo Oil Co., Ltd. (n-pentane/i-pentane = 75/25 to 85/15);
Gas c is a product named Cosmo butane silver, manufactured by Cosmo Oil Co., Ltd. (n-butane/i-butane = 60/40 to 70/30); and
Predetermined expansion factor is 50 for PE/PS = 30/70 and 30 for PE/PS = 40/60.

Examples 1 to 6 and Comparative Examples 1 to 5 indicate that the expandable composite resin particles in which the modified resin particles have a water content of 500 to 5000 ppm and a blowing agent content of 7.5 to 11.0% by weight hardly change in quality even after long-term storage.

Furthermore, Examples 1 to 6 and Comparative Example 6 indicate that pentane is superior to butane as a blowing agent.

What is claimed is:

1. Expandable composite resin particles for long-term storage, comprising 500 to 5000 ppm of water and 7.5 to 11.0% by weight of pentane in a composite resin comprising 100 parts by weight of polyolefin-based resin and 110 to 730 parts by weight of polystyrene-based resin, wherein the polyolefin-based resin is selected from branched low-density polyethylene, linear low-density polyethylene, medium-density polyethylene, high-density polyethylene, ethylene-methyl methacrylate copolymer and cross-linked polymer of these polymers, propylene homopolymer, ethylene-propylene random copolymer, propylene-1-butene copolymer and ethylene-propylene-butene random copolymer, the polystyrene-based resin is a copolymer derived from styrene as a main component and a comonomer that can be copolymerized with styrene, the styrene accounts for 70% by weight or more of all monomers, and the comonomer is selected from a-methylstyrene, p-methylstyrene, acrylonitrile, methacrylonitrile, acrylic acid, methacrylic acid, acrylic acid alkylester, alkyl methacrylate ester, divinylbenzene and polyethylene glycol dimethacrylate.

* * * * *